(12) United States Patent
Nagata (10) Patent No.: US 6,809,998 B2
(45) Date of Patent: Oct. 26, 2004

(54) OPTICAL DISK DRIVE AND METHOD FOR PROCESSING DATA USING THE SAME

(75) Inventor: Masayoshi Nagata, Kanagawa (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 09/894,305

(22) Filed: Jun. 27, 2001

(65) Prior Publication Data

US 2002/0001263 A1 Jan. 3, 2002

(30) Foreign Application Priority Data

Jun. 30, 2000 (JP) ........................................ 2000-199319

(51) Int. Cl.$^7$ ................................................. G11B 7/00
(52) U.S. Cl. ................................................. 369/47.22
(58) Field of Search ........................... 369/47.22, 47.27, 369/47.28, 59.16, 59.19, 59.2, 59.21, 275.1, 275.3

(56) References Cited

U.S. PATENT DOCUMENTS 4,918,677 A * 4/1990 Ashinuma et al. ....... 369/30.12
5,684,774 A * 11/1997 Yamamuro ................ 369/47.28
6,385,257 B1 * 5/2002 Tobita et al. ................ 375/334
6,535,463 B2 * 3/2003 Nishino et al. .......... 369/13.01

* cited by examiner

Primary Examiner—Thang V. Tran
Assistant Examiner—Bach Vuong
(74) Attorney, Agent, or Firm—Frommer Lawrence & Haug LLP; William S. Frommer (57) ABSTRACT

In a disk-shaped recording medium such as an optical disk and the like, a reference clock with a frequency corresponding to a reproduction frequency of data reproduced from a data recording region is divided in accordance with a ratio between a record density of a header region where preformatted data including a sector mark for indicating a leading position of a sector is recorded, and a recording density of a data recording region subsequent to the header region, so as to produce a sampling clock. By use of thus-produced sampling clock, the sector mark is detected. Even if the header region has a recording density different from the recording density of the data region, to use a sector mark detector having the same structure as of a sector mark detector which is employed in the case where the header region has the same recording density as that of the data region.

11 Claims, 6 Drawing Sheets

| Column No. i | | | | 0 | 1 | 2 | | 7 | 8 | 9 | | 16 | 17 | 18 | 19 | Row No. i |
|---|---|---|---|---|---|---|---|---|---|---|---|---|---|---|---|---|
| SB1 | SB2 | SB3 | SB4 | D1 | D2 | D3 | | D8 | D9 | D10 | | D17 | D18 | D19 | D20 | 102 |
| | | | RS1 | D21 | D22 | D23 | | D28 | D29 | D30 | | D37 | D38 | D39 | D40 | 101 |
| | | RS1 | | D41 | D42 | D43 | | D48 | D49 | D50 | | D57 | D58 | D59 | D60 | 100 |
| | | RS2 | | D61 | D62 | D63 | | D68 | D69 | D70 | | D77 | D78 | D79 | D80 | 99 |
| | RS2 | | | D81 | D82 | D83 | | D88 | D89 | D90 | | D97 | D98 | D99 | D100 | 98 |
| | RS3 | | | D101 | D102 | D103 | | D108 | D109 | D110 | | D117 | D118 | D119 | D120 | 97 |
| | | RS3 | | D121 | D122 | D123 | | D128 | D129 | D130 | | D137 | D138 | D139 | D140 | 96 |
| | | | | | | | | | | | | | | | | |
| | | RS49 | | D1961 | D1962 | D1963 | | D1968 | D1969 | D1970 | | D1977 | D1978 | D1979 | D1980 | 4 |
| | RS49 | | | D1981 | D1982 | D1983 | | D1988 | D1989 | D1990 | | D1997 | D1998 | D1999 | D2000 | 3 |
| | RS50 | | | D2001 | D2002 | D2003 | | D2008 | D2009 | D2010 | | D2017 | D2018 | D2019 | D2020 | 2 |
| | | RS50 | | D2021 | D2022 | D2023 | | D2028 | D2029 | D2030 | | D2037 | D2038 | D2039 | D2040 | 1 |
| | | RS51 | | D2041 | D2042 | D2043 | | D2048 | SWF1 | SWF2 | | C1 | C2 | C3 | C4 | 0 |
| | RS51 | | | E1,1 | E2,1 | E3,1 | | E8,1 | E9,1 | E10,1 | | E17,1 | E18,1 | E19,1 | E20,1 | −1 |
| | RS52 | | | E1,2 | E2,2 | E3,2 | | E8,2 | E9,2 | E10,2 | | E17,2 | E18,2 | E19,2 | E20,2 | −2 |
| | | RS52 | | E1,3 | E2,3 | E3,3 | | E8,3 | E9,3 | E10,3 | | E17,3 | E18,3 | E19,3 | E20,3 | −3 |
| | | | | | | | | | | | | | | | | |
| | | RS58 | | E1,13 | E2,13 | E3,13 | | E8,13 | E9,13 | E10,13 | | E17,13 | E18,13 | E19,13 | E20,13 | −13 |
| | RS58 | | | E1,14 | E2,14 | E3,14 | | E8,14 | E9,14 | E10,14 | | E17,14 | E18,14 | E19,14 | E20,14 | −14 |
| | RS59 | | | E1,15 | E2,15 | E3,15 | | E8,15 | E9,15 | E10,15 | | E17,15 | E18,15 | E19,15 | E20,15 | −15 |
| | | RS59 | | E1,16 | E2,16 | E3,16 | | E8,16 | E9,16 | E10,16 | | E17,16 | E18,16 | E19,16 | E20,16 | −16 |

103 rows 16 rows

OPTICAL DISK DRIVE AND METHOD FOR PROCESSING DATA USING THE SAME

BACKGROUND OF THE INVENTION

1. Field of the Invention

The present invention relates to a disk drive for handling a disk-shaped record medium such as a magneto-optic disk, and a method for processing data using the same. Specifically, the present invention relates to an optical disk drive structured in such a manner that a reference clock having a frequency corresponding to a reproduction frequency of data reproduced from a data recording region is divided in accordance with a ratio between a record density of a header region where pre-formatted data including a sector mark for indicating a leading position of a sector is recorded, and a recording density of a data recording region subsequent to the header region, so as to produce a sampling clock, and by use of thus-produced sampling clock, the sector mark is detected. This structure enables, even if the header region has a recording density different from the recording density of the data region, to use a sector mark detector having the same structure as of a sector mark detector which is employed in the case where the header region has the same recording density as that of the data region and therefore a reference clock is used, thereby producing the optical disk drive at a low cost.

2. Description of the Related Art

Figure 1:
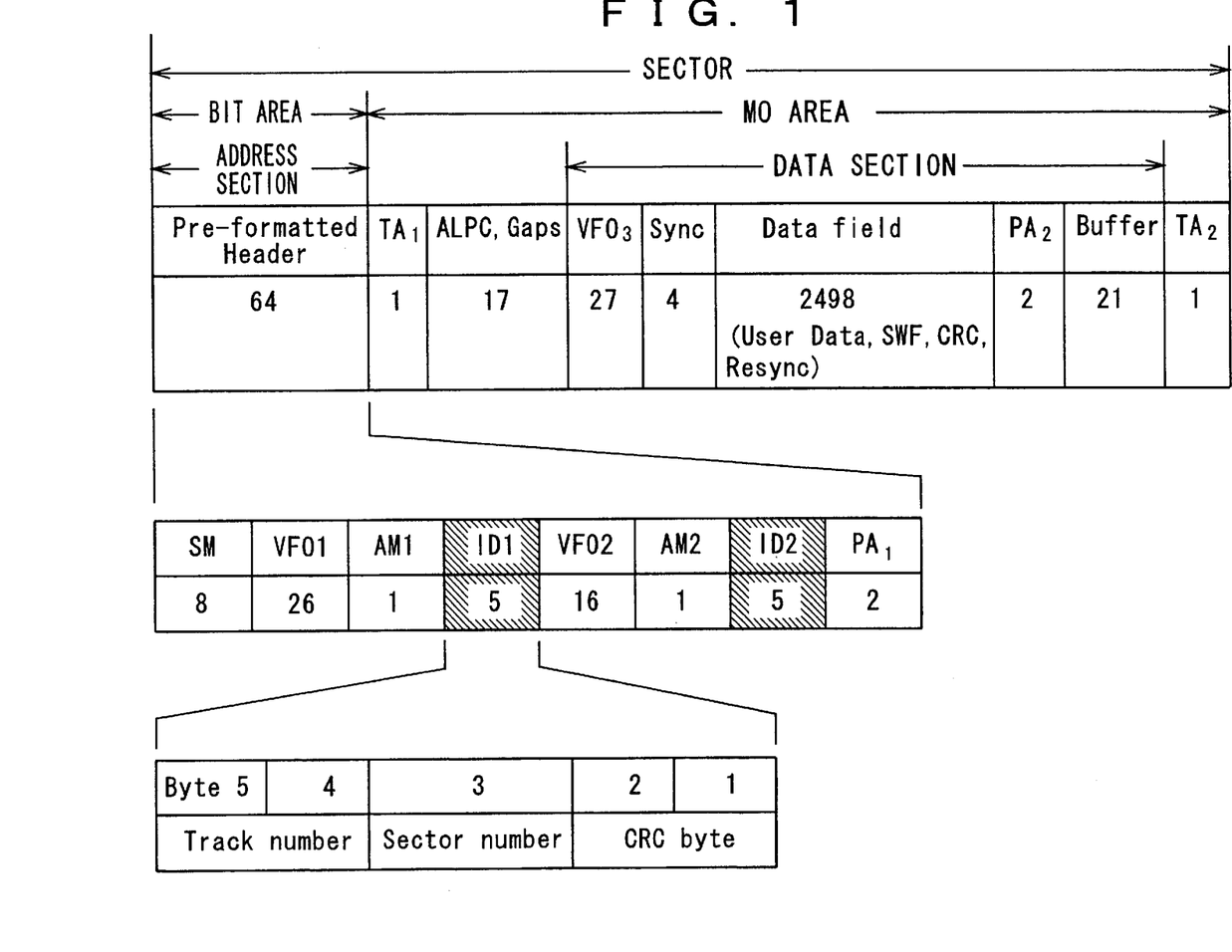
FIG. 1 is a diagram showing an example of a sector format of a magneto-optic disk.

FIG. 1 is a diagram showing a sector format of a magneto-optic disk (ISO/IEC 15286) of 5.2 GB on each of its sides. The numbers in FIG. 1 indicate numbers of bytes.

One sector is divided into a header, a transition area TA1, an ALPC gap, a VFO3, a sync-field, a data field, a postamble PA2, a buffer field, and a transition area TA2 in order of recording/reproduction.

This sector is broadly constituted by an address section (i.e. a header) and a data section. At the front and back of the data section, the ALPC gap, the transition area TA1, and the TA2 are placed. The header is a region exclusively used for reproduction, and in the header, so-called emboss pit are pre-formatted and recorded. The area other than the header, that is, the area from the transition area TA1 to the transition area TA2 is a magneto-optic (MO) area.

The header of 64 bytes as the address section is constituted by a sector mark SM (8 bytes), VFO1 in the VFO field (26 bytes), an address mark AM1 (1 byte), ID1 in the ID field (5 bytes), VFO2 in the VFO field (16 bytes), an address mark AM2 (1 byte), ID2 in the ID field (5 bytes), and postamble PA1 (2 bytes) in this order.

The sector mark SM is a mark used for identifying the initiation of the sector. The sector mark SM has a pattern which is formed by embossing and will not occur by (1–7) RLL code or (2–7) RLL code.

The VFO field is used to synchronize the variable frequency oscillator (VFO) at a phase-locked loop (PLL) section in the disk drive. In other words, the VFO field is a field into which the phase-locked loop is retracted. The VFO field in one sector is constituted by VFO1, VFO2, and VFO3. In the address section, VFO1 and VFO2 are formed by embossing. VFO3 is provided in the data section, and when data is recorded in the sector, the data is magneto-optically recorded in the VFO3.

In VFO1 and VFO2, recorded is a signal with a predetermined pattern for retracting the phase-locked loop (i.e. for generating a read clock) to read the data from the header. On the other hand, in VFO3, recorded is a signal with a predetermined pattern for retracting the phase-locked loop (i.e. for generating a read clock) to read the data from the data section.

The address marks AM1, AM2 are used for synchronization of bytes for the subsequent ID field, and have predetermined patterns. In the address section, the address marks AM1, AM2 are formed by embossing. The ID field is constituted by sector address information, that is, information about track number and sector number (3 bytes), and CRC byte (2 bytes) for detecting error which has occurred in the track number and sector number information in this order. Into the ID fields ID1, ID2, each having 5 bytes, the same data is recorded. In the address section, ID1 and ID2 are formed by embossing.

Subsequent to the header, an ALPC gap is placed via the transition area TA1. The ALPC gap is used for obtaining time that the disk drive needs for the processing performed after the reading from the header is completed, for permitting the displacement of the position of the subsequent VFO3, for testing laser power at the time of recording, and the like.

The data section is constituted by VFO3, a sync-field, a data field, postamble PA2, and a buffer field. The sync-field is used for synchronization of bytes for the data field subsequent to the sync-field, and has a predetermined bit pattern.

The data field is provided for recording user data. In the data field, 2048 bytes are reserved for the user data. In addition to the user data, parities, and the like for error detection and error correction are also recorded in the data field. As a result, the data field has 2498 bytes. The buffer field is a margin for rotation jitter.

FIG. 2 is a diagram showing a data structure of a magneto-optic disk having 2048 byte/sector.

"SB1" to "SB4" are sync bytes, and are synchronization signals which are recorded in the sync-field described above. "RS1" to "RS59" are resync bytes for resynchronization, and are provided at every 40 bytes, that is, at every 2 interleaves. "D1" to "D2048" are user bytes, and are provided into a length of 20 bytes in a column direction and sequentially in a row direction. "SWF1" and "SWF2" are sector written flag (SWF) bytes. "C1" to "C4" are CRC bytes. "E1, 1" to "E20, 16" are parities for error correction. The parities are generated in a row direction.

In the magneto-optic disk of 5.2 GB on each of its sides, the header (i.e. the address section) and the data section have the same recording densities with each other. Hereinafter, the process of reading data from this magneto-optic disk will be briefly described.

First, a sector mark is detected from the reproduction data by use of a reference clock having a frequency which corresponds to the reproduction frequency of the data to be reproduced from the data section. As a result of detecting the sector mark, it is acknowledged that there is an ID field located in a rearward position. Then, an address mark AM1 is detected from the reproduction data by use of the read clock obtained by retracting phase-locked loop into VFO1. In this case, in order to prevent erroneous detection, a detection window for address mark is created. The detection of address mark is permitted only during the period when the window is opened. The detection window is created based on a count value obtained by counting the reference clock based on the position where the sector mark is detected.

When the address mark AM1 is detected, the ID field ID1 of 5 bytes subsequent to the address mark AM 1 is read and decoded to obtain sector address information (i.e. information about track number and sector number). From the sector address information, the current position is acknowledged. The same process is performed in the subsequent VFO2, AM2, and ID2. If it is impossible to read ID1, the current position is acknowledged in ID2. As a result of acknowledging the current position, if the sector is a target sector, the reading from the data field is performed. At this time, the data field is different from the ID field only in that the data field has sync bytes and resync bytes, instead of address mark.

In recent years, as one of techniques for giving higher density to magneto-optic disks, a magnetically induced super resolution (MSR) reproduction method has been suggested. The MSR reproduction method is a technique capable of reading recorded information from a region having an area smaller than a laser beam spot, by use of magnetic films having different temperature characteristics from each other. It is possible, therefore, to read information recorded in high density from MSR media with no need of reducing the diameter of laser beam spot, if the MSR media have a recording region with two-layered structure constituted by two magnetic films having different temperature characteristics.

Figure 3A:
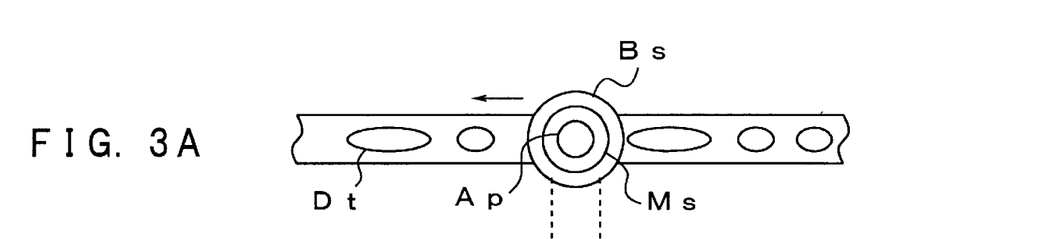
FIGS. 3A and 3B are diagrams for illustrating a magnetically induced super resolution (MSR) reproduction method.
Figure 3B:
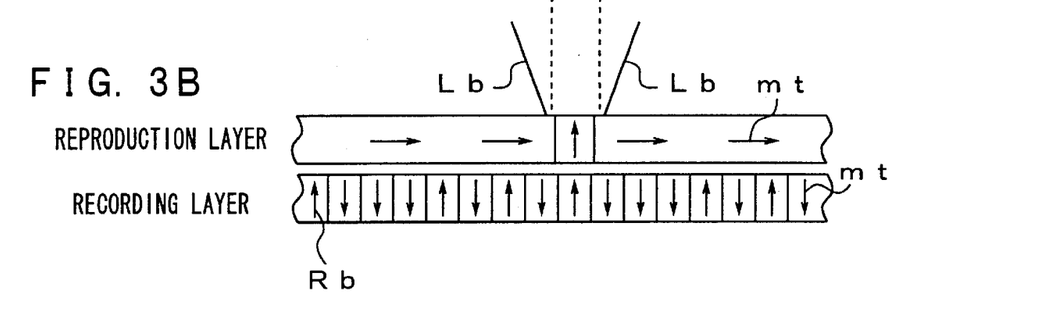

The MSR reproduction method will be described in more detail. FIG. 3A is a diagram showing a recording track Dt and a spot Bs of a laser beam irradiated onto the recording track Dt. FIG. 3B is a diagram partially showing a cross-section of a magneto-optic disk. In order to achieve the effect of MSR, as shown in FIG. 3B, the magneto-optic disk is required to have a recording layer and reproduction layer which exhibit different magnetic characteristics from each other according to temperature.

The reproduction layer is a mask Ms for shielding the recording layer from the spot Bs of the laser beam Lb. As seen in FIGS. 3A and 3B, when a laser beam Lb with laser power at a level of reproduction is irradiated onto the reproduction layer, a small window (i.e. an aperture Ap) is formed on the reproduction layer. The direction of magnetization mt of the recording bit Rb of the recording layer, which is located beneath the aperture Ap, is transferred. By observing the direction of magnetization mt which has been transferred to the reproduction layer, the recording bit Rb recorded in high density can be read, even if the laser beam Lb has a large spot diameter.

As describe above, the direction of magnetization mt is transferred from the recording layer to the reproduction layer by irradiation of the laser beam Lb with laser power at a level of reproduction. At this time, it is possible to control the size of aperture Ap, that is, the area where the direction of magnetization is transferred from the recording layer to the reproduction layer by adjusting the laser power at a level of reproduction of the laser beam. Therefore, it is possible to exploit the frequency characteristics of the signal reproduced from the magneto-optic disk by successfully controlling the level of laser power for reproduction. The use of MSR reproduction technique such as described above makes it possible to reproduce data recorded in a density two times or higher than the case where no MSR technique is used, even if a beam with the same spot diameter is used.

As described above, the use of MSR reproduction technique greatly increases the recording capacity of the magneto-optic disk. However, the MSR reproduction technique is not applicable to the entire area of the magneto-optic disk. As has been described above, the magneto-optic disk employs a recording unit referred to as a sector, as a basic data format on the disk. The sector is formed by a header in which pre-formatted data is recorded by emboss pits, and an MO area where data can be recorded and reproduced (i.e. a data recording region). In thus-structured magneto-optic disk, a recording film intended for use in MSR reproduction method can be formed in the MO area. In the header, it is impossible to perform the MSR reproduction method.

As described above, it is impossible to perform the MSR reproduction method in the header. Therefore, the MSR reproduction method is performed in the MO area. In the magneto-optic disk where the MSR reproduction method is performed in its MO area, in order to stably read data from its header, the recording density in the header is inevitably suppressed to be lower than the recording density in the MO area. In this case, it is impossible to use the sector mark detector as it is which uses a reference clock with a frequency corresponding to the reproduction frequency of the data reproduced from the data section. This is because, as has been described above, the reference clock does not correspond to the reproduction frequency of the data reproduced from the header.

SUMMARY OF THE INVENTION

The objective of the present invention is to provide an optical disk drive capable of using, even if the header region has a recording density different from that of the data recording region, a sector mark detector having the same structure as that used in the case where the header region and the data recording region have the same recording densities, and therefore the reference clock is used.

In an aspect of the present invention, an optical disk drive for handling an optical disk in which a sector as a recording unit is formed by a header region where pre-formatted data including a sector mark for indicating a leading position of a sector and a data recording region subsequent to the header region, and the header region has a recording density different from the recording density of the data recording region, includes: a data reproduction device for reproducing the pre-formatted data from the header region in the sector, and for reproducing data from the data recording region of the sector; a clock generator for generating a reference clock with a frequency corresponding to a reproduction frequency of the data reproduced from the data recording region in the sector; a divider for dividing the reference clock in accordance with the ratio between the recording density of the header region and the recording density of the data recording region, so as to generate a sampling clock with a frequency corresponding to the reproduction frequency of the pre-formatted data reproduced from the header region; and a sector mark detector for detecting the sector mark from the pre-formatted data reproduced in the data reproducing device, by use of the sampling clock.

In another aspect of the present invention, a method for processing reproduction data in an optical disk drive for handling an optical disk in which a sector as a recording unit is formed by a header region where pre-formatted data including a sector mark for indicating a leading position of a sector and a data recording region subsequent to the header region, and the header region has a recording density different from the recording density of the data recording region, includes the steps of: reproducing the pre-formatted data from the header region in the sector, and for reproducing data from the data recording region of the sector; generating a reference clock with a frequency corresponding to a reproduction frequency of the data reproduced from the data recording region in the sector; dividing the reference clock in accordance with the ratio between the recording density of the header region and the recording density of the data recording region, so as to generate a sampling clock with a frequency corresponding to the reproduction frequency of the pre-formatted data reproduced from the header region; and detecting the sector mark from the pre-formatted data reproduced in the data reproducing device, by use of the sampling clock.

In the present invention, handled is an optical disk in which a sector as a recording unit is formed by a header region and a data recording region, and the header region has a recording density different from the recording density of the data recording region. For example, the ratio between the recording density of the header region and the recording density of the data recording region is 1/2. Pre-formatted data is reproduced from the header region in the sector, and data is reproduced from the data recording region in the sector.

Then, a reference clock with a frequency corresponding to the reproduction frequency of the data reproduced from the data recording region in the sector is produced. For example, in the case of employing a zone constant angular velocity (ZCAV) method, the optical disk has a recording region divided into plural zones in its radial direction. The reference clock frequency produced by the clock generator has a frequency different from zone to zone.

The reference clock is divided in accordance with the ratio between the recording density of the header region and the recording density of the data recording region. Then, a sampling clock with a frequency corresponding to the reproduction frequency of the pre-formatted data reproduced from the header region is produced. By use of thus-produced sampling clock, a sector mark is detected from the pre-formatted data.

As described above, the sampling clock is produced by dividing the reference clock, and the sector mark is detected by use of thus-produced sampling clock. With this arrangement, even if the header region has a recording density different from the recording density of the data recording region, it is possible to use a sector-mark detector having the same structure as of a sector mark detector used in the case where the header region and the data recording region have the same recording densities, and therefore a reference clock is used. The optical disk drive with this structure can be obtained at a low cost.

In addition, a window signal for designating the range in which the address mark is to be detected from the pre-formatted data is produced by use of the aforementioned sampling clock. With this arrangement, even if the header region has a recording density different from the recording density of the data recording region, it is possible to use a window generator having the same structure as of a window generator used in the case where the header region and the data recording region have the same recording densities, and therefore a reference clock is used. The optical disk drive with this structure can be obtained at a low cost.

In still another aspect of the present invention, an optical disk drive for handling an optical disk in which a sector as a recording unit is formed by a header region and a data recording region subsequent to the header region, includes: an information obtaining device for obtaining information about a ratio between the recording density of the header region and the recording density of the data recording density; a data reproduction device for reproducing the pre-formatted data from the header region in the sector, and for reproducing data from the data recording region of the sector; a clock generator for generating a reference clock with a frequency corresponding to a reproduction frequency of the data reproduced from the data recording region in the sector; a divider for dividing the reference clock in accordance with the ratio between the recording density of the header region and the recording density of the data recording region, so as to generate a sampling clock with a frequency corresponding to the reproduction frequency of the pre-formatted data reproduced from the header region; and a sector mark detector for detecting the sector mark from the pre-formatted data reproduced in the data reproducing device, by use of the sampling clock.

In still another aspect of the present invention, a method for processing data in an optical disk drive for handling an optical disk in which a sector as a recording unit is formed by a header region and a data recording region subsequent to the header region, includes the steps of: obtaining information about a ratio between the recording density of the header region and the recording density of the data recording density; reproducing the pre-formatted data from the header region in the sector, and for reproducing data from the data recording region of the sector; generating a reference clock with a frequency corresponding to a reproduction frequency of the data reproduced from the data recording region in the sector; dividing the reference clock in accordance with the ratio between the recording density of the header region and the recording density of the data recording region, so as to generate a sampling clock with a frequency corresponding to the reproduction frequency of the pre-formatted data reproduced from the header region; and detecting the sector mark from the pre-formatted data reproduced in the data reproducing device, by use of the sampling clock.

In the present invention, handled are various kinds of optical disks each in which a sector as a recording unit is formed by a header region and a data recording region, and the header region has a recording density different from the recording density of the data recording region. For example, the ratio between the recording density of the header region and the recording density of the data recording region is 1, 1/2, and the like. When an optical disk is mounted onto the optical disk drive, information about the ratio of the recording density of the header region and the recording density of the data recording region is obtained. This information is obtained by, for example, being reproduced from an information recording region that the optical disk has.

Pre-formatted data is reproduced from the header region in the sector, and data is reproduced from the data recording region in the sector of the optical disk mounted onto the optical disk drive. For example, in the case of employing a zone constant angular velocity (ZCAV) method, the optical disk has a recording region divided into plural zones in its radius direction. The reference clock produced by the clock generator has a frequency different from zone to zone.

The reference clock is divided in accordance with the ratio, obtained in the above-described manner, between the recording density of the header region and the recording density of the data recording region, so as to produce a sampling clock with a frequency corresponding to the reproduction frequency of the pre-formatted data reproduced from the header region. By use of thus-produced sampling clock, a sector mark is detected from the pre-formatted data.

As described above, the sampling clock is produced by dividing the reference clock, and the sector mark is detected by use of thus-produced sampling clock. With this arrangement, even in the case of handing an optical disk in which the header region has a recording density different from the recording density of the data recording region, it is possible to use a sector mark detector having the same structure as of a sector mark detector used in the case where the header region and the data recording region have the same recording densities, and therefore a reference clock is used. The optical disk drive with this structure can be obtained at a low cost.

In addition, a window signal for designating the range in which the address mark is to be detected from the preformatted data is produced by use of the aforementioned sampling clock. With this arrangement, even in the case of handling an optical disk in which the header region has a recording density different from the recording density of the data recording region, it is possible to use a window generator having the same structure as of a window generator used in the case where the header region and the data recording region have the same recording densities, and therefore a reference clock is used. The optical disk drive with this structure can be obtained at a low cost.

The information about the ratio between the recording density of the header region and the recording density of the data recording region is obtained, for example, from the optical disk mounted to the optical disk drive, and the dividing ratio is automatically switched. With this structure, even if various kinds of optical disks having various ratio between the recording density of the header region and the recording density of the data recording region are mounted, it is possible to use sector mark detectors of the same structure and window generators of the same structure for these optical disks. The optical disk drive with this structure can be obtained at a low cost. In addition, since the dividing ratio is not manually switched, the user can omit the procedure of switching the dividing ratio.

BRIEF DESCRIPTION OF THE DRAWINGS

FIG. 2 is a diagram showing an exemplary structure of data recorded in a data section.

DESCRIPTION OF THE PREFERRED EMBODIMENT

Figure 4:
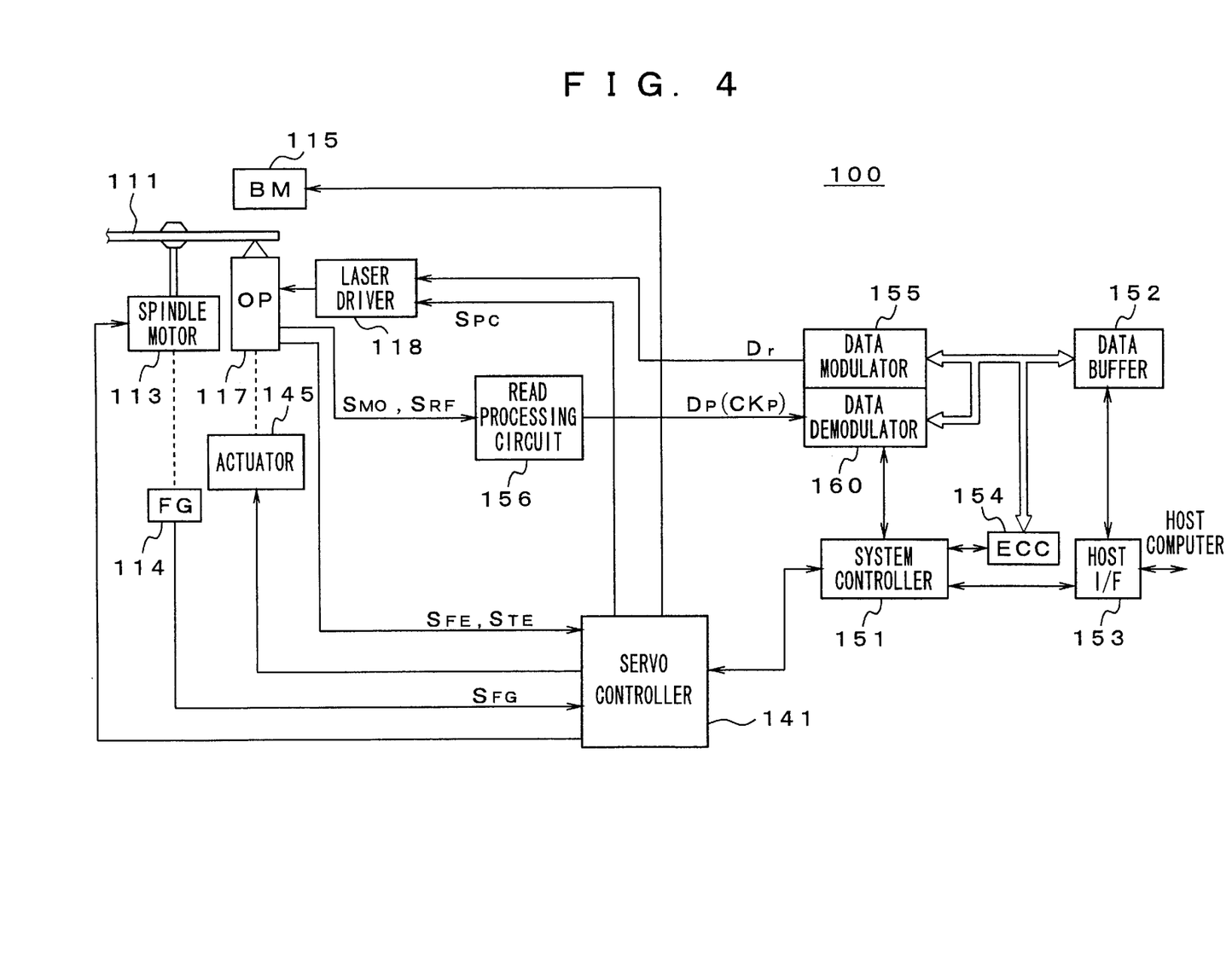
FIG. 4 is a block diagram showing a structure of a magneto-optic disk drive according to an embodiment of the present invention.

Hereinafter, embodiments of the present invention will be described with reference to drawings. FIG. 4 is a diagram showing a structure of a magneto-optic disk drive 100.

In the magneto-optic disk drive 100, a magneto-optic disk 111 is handled. The magneto-optic disk 111 has, although not shown in FIG. 4, grooves formed in the shape of spiral on its recording surface. These grooves and lands located between the grooves together constitute tracks for use in recording and reproducing information.

Figure 5:
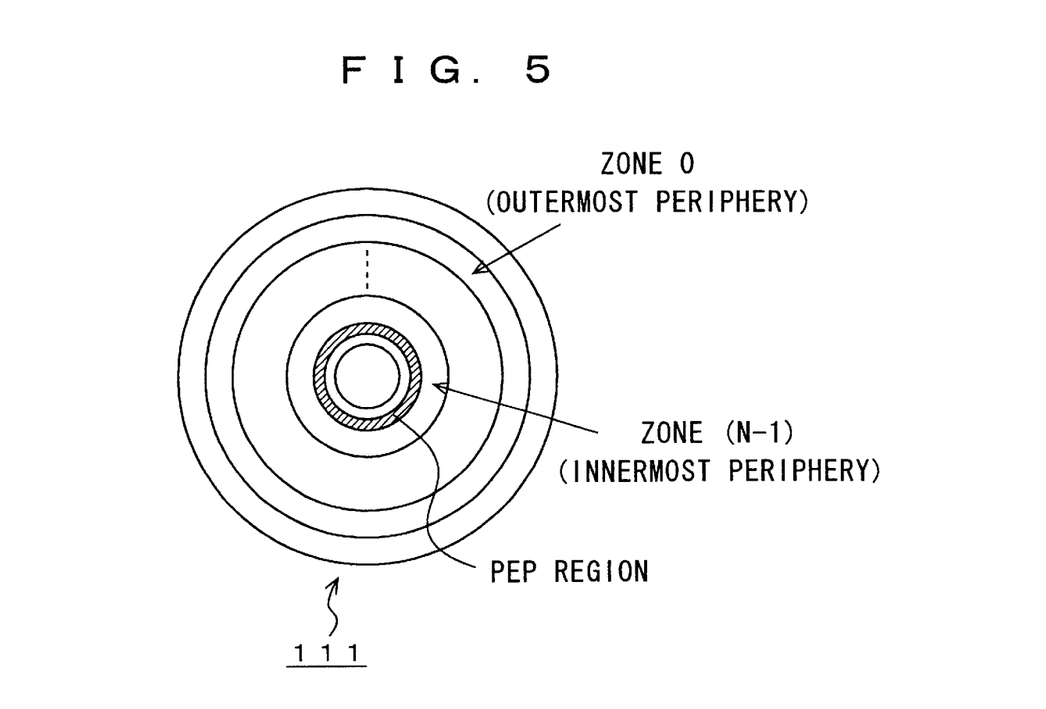
FIG. 5 is a diagram showing a layout of a magneto-optic disk.

FIG. 5 is a diagram showing a layout of the magneto-optic disk 111. The magneto-optic disk 111 is in a zone constant angular velocity (ZCAV) mode, and has a recording region constituted by N zones from zone 0 to zone (N−1) in a direction from the outer peripheral side toward an inner peripheral side. In the ZCAV mode, the disk is rotated at a constant velocity, and has a recording frequency (i.e. reproduction frequency) higher at its outer peripheral zone than its inner peripheral zone.

Each zone has plural sectors along the direction of its perimeter. The number of sectors per perimeter is larger at the outer peripheral zone than at the inner peripheral zone. Each sector is constituted by a format shown by FIG. 1, for example. The data recorded in the data field has a structure shown in FIG. 2, for example. The magneto-optic disk 111 has a header, and a MO area as a data recording region, and they may have the same or different recording densities. For example, the magneto-optic disk 111 may be structured so that the MSR reproduction is employed in its MO area as described above, and its header has a recording density lower than the recording density of the MO area.

Referring again to FIG. 5, the magneto-optic disk 111 has a phase-encoded-part of the control tracks (PEP) region at further inner peripheral side of the zone (N−1). In the PEP region, information about the attribute of the magneto-optic disk 111 is recorded. The PEP region is a region exclusively used for reproduction of the data recorded by use of so-called emboss pits. The attribute information recorded in the PEP region includes: information about servo mode such as continuous mode and sample servo mode; information about sector arrangement such as CAV and ZCAV; and information about data modulation mode. In addition to these, the attribute information also includes ratio between the recording density of the header and the recording density of the MO area.

Referring again to FIG. 4, the drive 100 includes a spindle motor 113 for driving the magneto-optic disk 111 to rotate. The magneto-optic disk 111 is driven to rotate at a constant angular velocity at the time of recording and reproduction. The spindle motor 133 has a frequency generator 114 attached to its rotation shaft and used for detecting the rotation velocity of the rotation shaft of the spindle motor 113.

The drive 100 includes a bias magnet (BM) 115, an optical pickup 117 constituted by a semiconductor laser, an object lens, a photodetector and the like, and a laser driver 118 for controlling the light emitted from the semiconductor laser of the optical pickup 117. The bias magnet 115 and the optical pickup 117 are located so as to face each other in the state where the magneto-optic disk 111 is interposed therebetween.

To the laser driver 118, a laser power control signal SPC is supplied from a servo controller 141 which will be described later to control the power of laser beam emitted from the semiconductor laser of the optical pickup 117 to the level optimum at the time of recording and reproduction. The servo controller 141 also controls the operation of the bias magnet 115 when the bias magnet 115 generates the external magnetic field.

When data is written (i.e. recorded), recorded data Dr as not return to zero inverted (NRZI) data is supplied to the laser driver 118, as will be described later. The laser beam emitted from the semiconductor laser is modulated by the recorded data Dr. In collaboration with the external magnetic field provided from the bias magnet 115, the recorded data Dr is recorded into the magneto-optic disk 111.

The drive 100 also includes a servo controller 141 having a central processing unit (CPU). To the servo controller 141, provided are a focus error signal SFE and a tracking error signal STE which are produced in the optical pickup 117, and a frequency signal SFG output from the frequency generator 114 which has been described above.

The operation of the servo controller 141 is controlled by a system controller 151 which will be described later. The servo controller 141 controls the actuator 145 which includes a tracking coil, a focus coil, and a feed motor for driving the optical pickup 117 to move in a radial direction. The servo controller 141 also performs servo for the tracking and focusing, and controls the movement of the optical pickup 117 in the radius direction. In addition, the servo controller 141 controls the rotation of the spindle motor 113, so as to drive the magneto-optic disk 111 to rotate at a constant angular velocity, for example, at 3000 rpm at the time of recording and reproduction.

The drive 100 also includes a system controller 151 having a CPU, a data buffer 152, a host interface 153 for sending and receiving data and commands with a host computer as an upper-level apparatus, for example, a small computer system interface (SCSI). The system controller 151 is used for controlling the entire system.

The drive 100 also includes an error correction code (ECC) circuit 154, and a data modulator 155. The ECC circuit 154 is used for adding a error correction code to the write data supplied from the host computer through the interface 153. In addition, the ECC circuit 154 performs error correction for the data output from a data demodulator 160 which will be described later. The data modulator 155 converts the data bit string of the write data to which the error correction code has been added in the ECC circuit 154 into a run length limited (RLL) modulation bit. Then, the data modulator 155 converts thus-obtained RLL modulation bit into NRZI data to obtain recorded data Dr.

As the RLL modulation, (1, 7) RLL modulation is employed, for example. In the (1, 7) RLL modulation, 2-bit data is converted into 3-channel bit data so as to control the number of zero located between 1 and 1 of the channel bit to the range from 1 to 7. In the NRZI data, 1 of the channel bit is corresponded to polarity inversion, and 0 of the channel bit is corresponded to polarity non-inversion. The interval of polarity inversion is in the range between 2-channel bit to 8-channel bit.

The drive 100 also includes a read processing circuit 156 and a data demodulator 160. The read processing circuit 156 performs waveform equalization, binarization, and data detection for a reproduction signal SMO and a sum signal SRF which are obtained from the optical pickup 117, so as to obtain a reproduction data Dp of the header (i.e. address section) or the MO area. The data demodulator 160 performs demodulation for the reproduction data Dp, so as to obtain sector address information (i.e. information about the track number and sector number) or the read data. The sector address information obtained in the data demodulator 160 is supplied to the system controller 151 where the sector address information is used for controlling the positions where recording and reproduction are made.

Hereinafter, an operation of the magneto-optic disk drive 100 shown in FIG. 4 will be described. When a data write command is supplied from the host computer to the system controller 151, data is written (recorded). In this case, the write data from the host computer is received by the interface 153 and is stored in the data buffer 152. Then, the data is provided to the ECC circuit 154 where an error correction code is added to the data. Thus-obtained data is then converted into a RLL modulation bit data or NRZI data in the data modulator 155.

The data modulator 155 provides recorded data Dr as NRZI data to the laser driver 118. The recorded data Dr is recorded in the magneto-optic disk 111 in its data field as a target position. In this case, the optical pickup 117 emits laser beam to the magnet optic disk 111. The laser beam has such a high power that the recording film of the magneto-optic disk 111 reaches at Curie temperature.

Contrary to the above, when a data read command is supplied from the host computer to the system controller 151, data is read (i.e. reproduced) from the target position of the magneto-optic disk 111. In this case, the optical pickup 117 emits light to the magneto-optic disk 111 at its data field of the sector as a target position, so as to obtain a reproduction signal SMO. For thus-obtained reproduction signal SMO, the read processing circuit 156 performs waveform equalization, binarization, read clock generation by drawing PLL, data detection, and the like, so as to obtain a reproduction data Dp.

The reproduction data Dp is demodulated in the data demodulator 160. The demodulated data is then subjected to error correction in the ECC circuit 154 to obtain read data. The read data is temporality stored in the data buffer 152, and is transmitted to the host computer through the interface 153 at a later predetermined timing.

Figure 6:
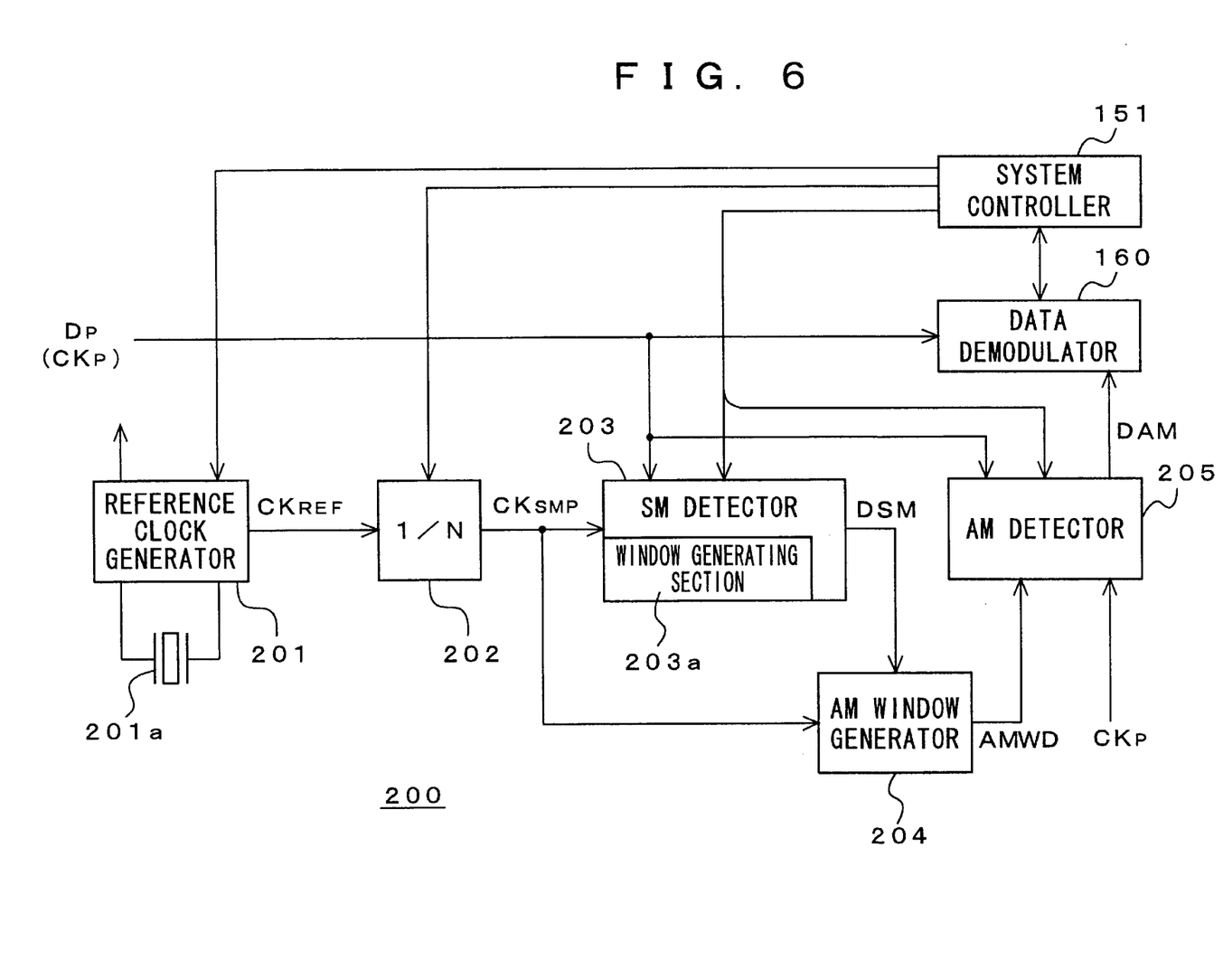
FIG. 6 is a block diagram showing a structure of header processing system.

Hereinafter, a structure of the header processing system 200 will be described. In FIG. 3, constituent elements corresponding to those of FIG. 4 are denoted by the same reference numerals.

The header processing system 200 includes a reference clock generator 201 for generating a reference clock CKRER with a frequency corresponding to the reproduction frequency of the data reproduced from the MO area of the sector. The generator 201 is structured so that it magnifies an oscillation signal from a quartz oscillator 201a by M/N times (where M and N are integers) to obtain a reference clock CKREF with a stable frequency. The reference clock CKREF is also used in the servo controller 141 and the read processing circuit 156 and the like (see FIG. 4).

As described above, the magneto-optic disk 111 is in ZCAV mode, and therefore, the reproduction frequency of the data reproduced from the MO area of the sector differs from zone to zone. To handle thus-structured magneto-optic disk 111, in the reference clock generator 201, the values of M and N are set by the system controller 151, and the frequency of the produced reference lock CKRE is varied in accordance with the zone where the optical pickup 117 is located.

The header processing system 200 also includes a divider 202. The divider 202 divides the reference clock CKREF generated in the reference clock generator 201, so as to produce a sampling clock CKSMP with a frequency corresponding to the reproduction frequency of the pre-formatted data reproduced from the header.

The dividing ratio of the divider 202 is switched by the system controller 151 in accordance with the ratio between the recording density of the header and the recording density of the MO area. For example, when the recording density of the header and the recording density of the MO area are the same with each other, the dividing ratio is set to 1. In this case, no division is performed, and the sampling clock CKSMP is identical to the reference clock CKRE. On the other hand, when the recording density of the header is 1/2 of the recording density of the MO area, the dividing ratio is set to 1/2. In this case, the reference clock CKRE is divided into 1/2, so as to obtain a sampling clock CKSMP. In general, when the recording density of the header is 1/n of the recording density of the MO area, the dividing ratio is set to 1/n.

The system controller 151 obtains the information about the ratio between the recording density of the header and the recording density of the MO area in the following manner. When the magneto-optic disk 111 is mounted to the magneto-optic disk drive, the optical pickup 111 is moved into the PEP region at the inner peripheral side, so as to reproduce data from the PEP region. Then, the sum signal SRM from the optical pickup 111 is processed in the read processing circuit 156 to obtain reproduction data Dp. Thus-obtained reproduction data Dp is supplied to the data demodulator 160. In the data demodulator 160, the information about the ratio between the recording density of the header and the recording density of the MO area is extracted from the reproduction data Dp. The extracted information is then supplied to the system controller 151.

In addition to the reproduction data Dp, also supplied to the data demodulator 160 is a read clock CKp obtained by drawing PLL into the read processing circuit 156. The read clock CKp is used for data demodulation and data extraction in the demodulator 160.

Figure 7:
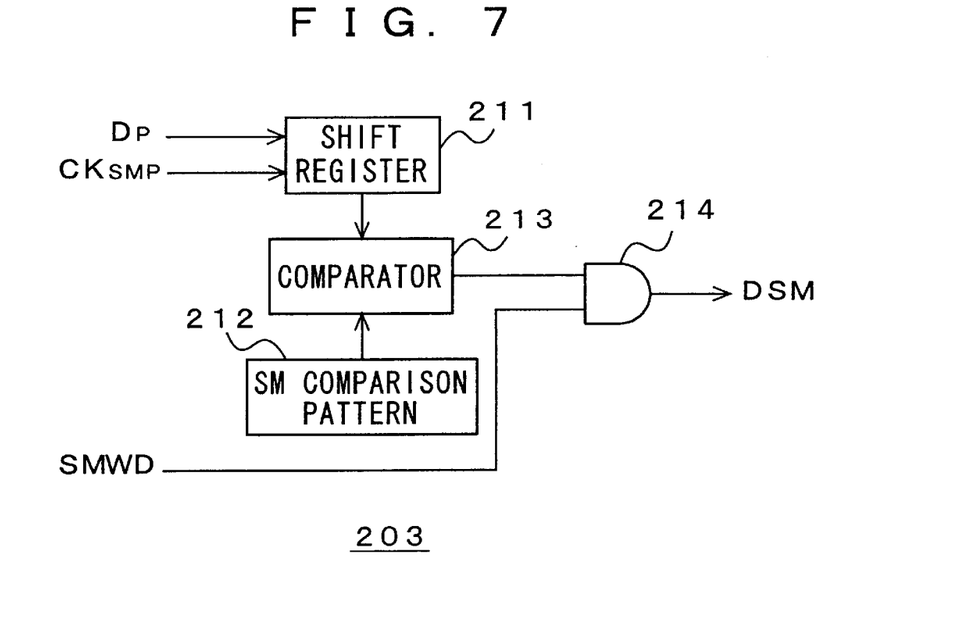
FIG. 7 is a block diagram showing a structure of a sector mark detector.

The header processing system 200 also includes a sector mark detector 203 for detecting a sector mark SM from the reproduction data Dp. The operation of the sector mark detector 203 is controlled by the system controller 151. FIG. 7 is a diagram showing a structure of the sector mark detector 203. In FIG. 7, a section 203a for generating a window signal SMWD used for detecting the sector mark SM is omitted.

The sector mark detector 203 is constituted by a shift register 211, a register 212, a comparator 213, and an AND circuit 214. The shift register 211 sequentially shifts the input reproduction data Dp by use of the sampling clock CKSMP, and has stages in number corresponding to at least the total bits of the sector mark SM. In the register 212, a comparison pattern signal of the sector mark SM is stored. The comparator 213 compares the output from the register of each stage of the shift register 211 with the comparison pattern signal stored in the register 212. If they coincide to each other, the comparator 213 outputs, for example, a signal at high level. The AND circuit 214 gates the output from the comparator 213 by use of the window signal SMWD. In thus-structured sector mark detector 203, when the sector mark SM is detected in the state where the window is opened (i.e. the window signal SMWD is at high level), a detection signal DSM at high level is output from the AND circuit 214.

The header processing system 200 includes a window generator 204. The window generator 204 has a counter (not shown) to which a detection signal DSM output from the sector mark detector 203 is supplied as a reset signal. Based on the position where the sector mark is detected, the counter counts the sampling clock CKSMP. Based on the counted value by the counter, the window generator 204 generates a window signal AMWD for detecting an address mark AM. The window signal AMWD is used for preventing erroneous detection of the address mark AM. Although the counter is included in the window generator 204, it is also possible to employ a structure where the counter is located outside the window generator 204.

Figure 8:
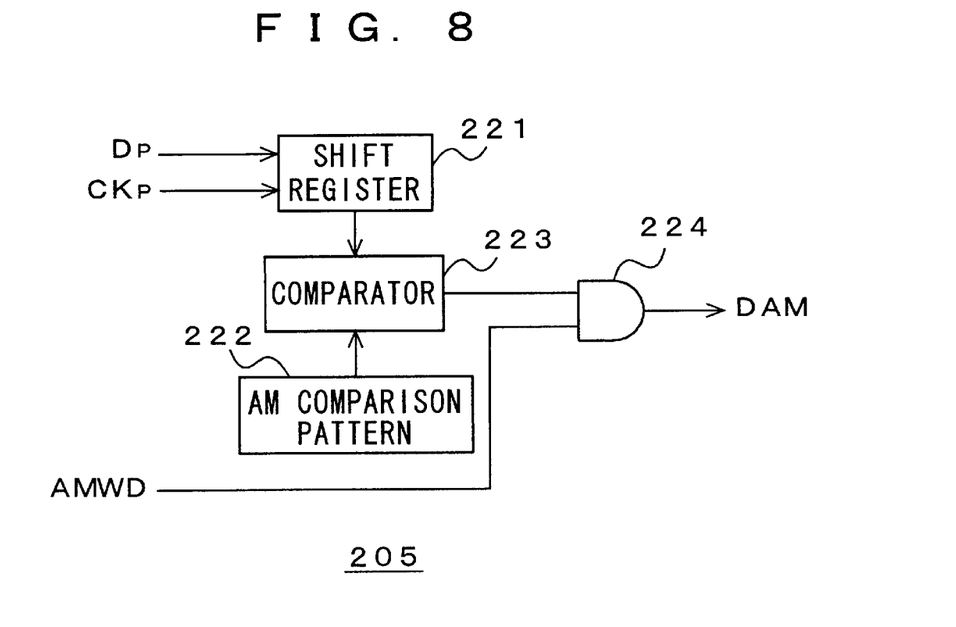
FIG. 8 is a block diagram showing an address mark detector.

The header 200 includes an address mark detector 205. The address mark detector 205 is used for detecting an address mark AM from the reproduction data Dp. The operation of the address mark detector 205 is controlled by the system controller 205. FIG. 8 is a diagram showing a structure of the address mark detector 205.

The address mark detector 205 is constituted by a shift register 221, a register 222, a comparator 223, and an AND circuit 224. The shift register 221 sequentially shifts the input reproduction data Dp by use of the reading clock CKp, and has stages in number corresponding to at least the total bits of the address mark AM. In the register 222, a comparison pattern signal of the address mark AM is stored. The comparator 223 compares the output from the register of each stage of the shift register 221 with the comparison pattern signal stored in the register 222. If they coincide to each other, the comparator 223 outputs, for example, a signal at high level. The AND circuit 224 gates the output from the comparator 223 by use of the window signal AMWD.

In thus-structured address mark detector 205, when the address mark AM is detected in the state where the window is opened (i.e. the window signal AMWD is at high level), a detection signal DAM at high level is output from the AND circuit 224. The detection signal DAM output from the address mark detector 205 is supplied to the data demodulator 160 where the detection signal DAM is used for synchronization of ID field extraction (i.e. reading).

Hereinafter, a process of reading data from the magneto-optic disk 111 will be briefly described.

The dividing ratio at the divider 202 in the header processing system 202 is switched beforehand by the system controller 151, in accordance with the ratio between the recording density of the header and the recording density of the MO area.

The system controller controls the operation of the reference clock generator 201 in such a manner that the reference clock generator 201 generates a reference clock CKREF with a frequency corresponding to the reproduction frequency of the data reproduced from the MO area of the sector in the zone where the optical pickup 117 is located. The reference clock CKREF which has been generated by the reference clock generator 201 is then divided by the divider 202, so as to produce a sampling clock CKSMP. The sampling clock CKSMP has a frequency corresponding to the reproduction frequency of the pre-formatted data reproduced from the header of the sector.

In this state, it is judged that the window is opened in the sector mark detector 203 (see FIG. 7). Based on this judgment, a sector mark SM is detected from the reproduction data Dp by use of the sampling clock CKSMP, and a detection signal DSM is output. The detection signal DSM is supplied to the window generator 204. Upon receiving the detection signal DSM, the window generator 204 generates a window signal AMWD for detecting an address mark AM.

The window signal AMWD is supplied to the address mark detector 205. In the address mark detector 205 (see FIG. 8), the detection of the address mark AM is possible during the period when the window is opened. This structure serves to prevent erroneous detection of address mark AM. The address mark detector 205 detects the address mark AM1 from the reproduction data Dp by use of the read cock CKp which is synchronous with the reproduction data Dp, and then, outputs a detection signal DAM.

The detection signal DAM output from the address mark detector 205 is supplied to the data demodulator 160. In the demodulator 160, the ID field ID1 of 5 bytes after the address mark AM1 is extracted (i.e. read) from the reproduction data Dp. The extracted ID field ID1 is demodulated to obtain sector address information (i.e. information about track number and sector number). The sector address information is then supplied to the system controller 151. The system controller 151 can recognize the current position from the sector address information.

Similarly, the address mark detector 205 detects the address mark AM2 from the reproduction data Dp, and outputs a detection signal DAM. The detection signal DAM is supplied to the data demodulator 160. In the demodulator 160, the ID field ID2 of 5 bytes after the address mark AM2 is extracted (i.e. read) from the reproduction data Dp. The extracted ID field ID1 is demodulated to obtain sector address information (i.e. information about track number and sector number). The sector address information is then supplied to the system controller 151. In this manner, the system controller 151 can recognize the current position from the ID field ID2, even if the ID field ID1 cannot be correctly read.

When the system controller 151 confirms that the current position is a target sector, it controls the operation of the data demodulator 160 in such a manner that the data demodulator 160 reads data field and demodulates thus-obtained data field.

As has been described above, in the embodiment of the present invention, the sampling clock CKSMP is produced by dividing the reference clock CLREF in accordance with the ratio between the recording density of the header in the sector and the recording density of the MO area in the next sector, and the sector mark SM is detected by use of thus-produced sampling clock CKSMP. With this arrangement, even if the header region has a recording density different from the recording density of the MO region, it is possible to use a sector mark detector 203 (see FIG. 4) having the same structure as of a sector mark detector used in the case where the header region and the MO area have the same recording densities, and therefore a reference clock CLREF is used. The optical disk drive with this structure can be obtained at a low cost.

In addition, a window signal AMWD for designating the range in which the address mark AM is to be detected from the pre-formatted data is produced by use of the aforementioned sampling clock CKSMP. With this arrangement, even if the header region has a recording density different from the recording density of the data recording region, it is possible to use a window generator 204 having the same structure as of a window generator used in the case where the header region and the MO region have the same recording densities, and therefore a reference clock CLREF is used. The optical disk drive with this structure can be obtained at a low cost.

In the above embodiment, the information about the ratio between the recording density of the header region and the recording density of the MO area is obtained from the PEP region of the magneto-optic disk, and the dividing ratio at the divider 202 in the header processing system 200 is automatically switched by the system controller 151. With this structure, even if various kinds of magneto-optic disks 111 having various ratio between the recording density of the header region and the recording density of the MO area are mounted, it is possible to use the sector mark detector 203 and the window generator 204 of the same structure and a window generator of the same structure for these optical disks. The optical disk drive with this structure can be obtained at a low cost. In addition, since the dividing ratio is not manually switched, the user can omit the procedure of switching the dividing ratio.

In the above embodiment, the magneto-optic disk drive is structured so that various kinds of magneto-optic disks 111 having various ratio between the recording density of the header region and the recording density of the data recording region are mounted, and the dividing ratio at the divider 202 in the header processing system 200 is switched in accordance with the ratio between the recording density of the header and the recording density of the MO area. Contrary to this, when the magneto-optic disks 111 having the same ratio between the recording density of the header and the recording density of the MO area are always mounted, the dividing ratio at the divider 202 may be at a fixed value. For example, when the magneto-optic disk 111 having the ratio between the recording density of the header and the recording density of the MO area of 1/2 is always mounted, the dividing ratio at the divider 202 is fixed to 1/2.

In the above embodiment, the information about the ratio between the recording density of the header and the recording density of the MO area is obtained from the PEP region of the magneto-optic disk 111. Alternative to this, this information may be obtained from the host computer or any other sites.

In the above embodiment, the present invention has been applied to the magneto-optic disk driver 100 for handling the magneto-optic disk 111. The present invention may be also applicable to optical disk drives for handling other kinds of optical disks.

According to the present invention, a sampling clock is produced by dividing a reference clock with a frequency corresponding to the reproduction frequency of data reproduced from the data recording region, in accordance with the ratio between the recording density of the header region in which pre-formatted data including a sector mark is recorded, and the recording density of the data recording region subsequent to the header region. The sector mark is detected by use of thus-produced sampling clock. With this arrangement, even in the case of handling an optical disk in which the header region has a recording density different from the recording density of the data recording region, it is possible to use a sector mark detector having the same structure as of a sector mark detector used in the case where the header region and the data recording region have the same recording densities, and therefore a reference clock is used. The optical disk drive with this structure can be obtained at a low cost.

In addition, according to the present invention, a window signal for designating the range in which the address mark is to be detected from the pre-formatted data is produced by use of the aforementioned sampling clock. With this arrangement, even in the case of handling an optical disk in which the header region has a recording density different from the recording density of the data recording region, it is possible to use a window generator having the same structure as of a window generator used in the case where the header region and the data recording region have the same recording densities, and a reference clock is used. The optical disk drive with this structure can be obtained at a low cost.

Furthermore, according to the present invention, the information about the ratio between the recording density of the header region and the recording density of the data recording region is obtained from the optical disk of the optical disk mounted onto the optical disk drive, and the dividing ratio is automatically switched. With this structure, even if various kinds of optical disks having various ratio between the recording density of the header region and the recording density of the data recording region are mounted, it is possible to use sector mark detectors of the same structure and window generators of the same structure for these optical disks. The optical disk drive with this structure can be obtained at a low cost. In addition, since the dividing ratio is not manually switched, the user can omit the procedure of switching the dividing ratio.

What is claimed is:

1. An optical disk drive for handling an optical disk in which a sector as a recording unit is formed by a header region where pre-formatted data including a sector mark for indicating a leading position of a sector and a data recording region subsequent to the header region, and the header region has a recording density different from the recording density of the data recording region, comprising:

a data reproduction device for reproducing the pre-formatted data from the header region in the sector, and for reproducing data from the data recording region of the sector;

a clock generator for generating a reference clock with a frequency corresponding to a reproduction frequency of the data reproduced from the data recording region in the sector;

a divider for dividing the reference clock in accordance with the ratio between the recording density of the header region and the recording density of the data recording region, so as to generate a sampling clock with a frequency corresponding to the reproduction frequency of the pre-formatted data reproduced from the header region; and a sector mark detector for detecting the sector mark from the pre-formatted data reproduced in the data reproducing device, by use of the sampling clock.

2. An optical disk drive according to claim 1, wherein the optical disk has a recording region divided into plural zones in its radial direction, and wherein the reference clock produced by the clock generator has a frequency different from zone to zone.

3. An optical disk drive according to claim 1, wherein the pre-formatted data includes an address mark, and sector address information subsequent to the address mark, and wherein the optical disk drive further comprises a window generator for generating a window signal for designating a range in which the address mark is to be detected from the pre-formatted data, by use of the sampling clock.

4. An optical disk drive for handling an optical disk in which a sector as a recording unit is formed by a header region and a data recording region subsequent to the header region, comprising:

an information obtaining device for obtaining information about a ratio between the recording density of the header region and the recording density of the data recording density;

a data reproduction device for reproducing the pre-formatted data from the header region in the sector, and for reproducing data from the data recording region of the sector;

a clock generator for generating a reference clock with a frequency corresponding to a reproduction frequency of the data reproduced from the data recording region in the sector;

a divider for dividing the reference clock in accordance with the ratio between the recording density of the header region and the recording density of the data recording region, so as to generate a sampling clock with a frequency corresponding to the reproduction frequency of the pre-formatted data reproduced from the header region; and a sector mark detector for detecting the sector mark from the pre-formatted data reproduced in the data reproducing device, by use of the sampling clock.

5. An optical disk drive according to claim 4, wherein the optical disk has an information recording region in which information about the ratio between the recording density of the header region and the recording density of the data recording region, and wherein the information obtaining device obtains the information about the ratio between the recording density of the header region and the recording density of the data recording region by reproducing this information from the information recording region.

6. An optical disk drive according to claim 4, wherein the optical disk has a recording region divided into plural zones in its radial direction, and wherein the reference clock produced by the clock generator has a frequency different from zone to zone.

7. An optical disk drive according to claim 4, wherein the pre-formatted data includes an address mark, and sector address information subsequent to the address mark, and wherein the optical disk drive further comprises a window generator for generating a window signal for designating a range in which the address mark is to be detected from the pre-formatted data, by use of the sampling clock.

8. A method for processing reproduction data in an optical disk drive for handling an optical disk in which a sector as a recording unit is formed by a header region and a data recording region subsequent to the header region, and the header region has a recording density different from the recording density of the data recording region, comprising the steps of:

reproducing the pre-formatted data from the header region in the sector, and for reproducing data from the data recording region of the sector;

generating a reference clock with a frequency corresponding to a reproduction frequency of the data reproduced from the data recording region in the sector;

dividing the reference clock in accordance with the ratio between the recording density of the header region and the recording density of the data recording region, so as to generate a sampling clock with a frequency corresponding to the reproduction frequency of the pre-formatted data reproduced from the header region; and detecting the sector mark from the pre-formatted data reproduced in the data reproducing device, by use of the sampling clock.

9. A method for processing data in an optical disk drive according to claim 8, wherein the pre-formatted data includes an address mark, and sector address information subsequent to the address mark, and wherein the method further comprises a step of generating a window signal for designating a range in which the address mark is to be detected from the pre-formatted data, by use of the sampling clock.

10. A method for processing data in an optical disk drive for handling an optical disk in which a sector as a recording unit is formed by a header region where pre-formatted data including a sector mark for indicating a leading position of a sector and a data recording region subsequent to the header region, comprising the steps of:

obtaining information about a ratio between the recording density of the header region and the recording density of the data recording density;

reproducing the pre-formatted data from the header region in the sector, and for reproducing data from the data recording region of the sector;

generating a reference clock with a frequency corresponding to a reproduction frequency of the data reproduced from the data recording region in the sector;

dividing the reference clock in accordance with the ratio between the recording density of the header region and the recording density of the data recording region, so as to generate a sampling clock with a frequency corresponding to the reproduction frequency of the pre-formatted data reproduced from the header region; and detecting the sector mark from the pre-formatted data reproduced in the data reproducing device, by use of the sampling clock.

11. A method for processing data in an optical disk drive according to claim 10, wherein the pre-formatted data includes an address mark, and sector address information subsequent to the address mark, and wherein the optical disk drive further comprises a window generator for generating a window signal for designating a range in which the address mark is to be detected from the pre-formatted data, by use of the sampling clock.

* * * * *